O. W. WARD.
CONTAINER.
APPLICATION FILED JULY 7, 1916.
1,290,689.
Patented Jan. 7, 1919.
2 SHEETS—SHEET 1.
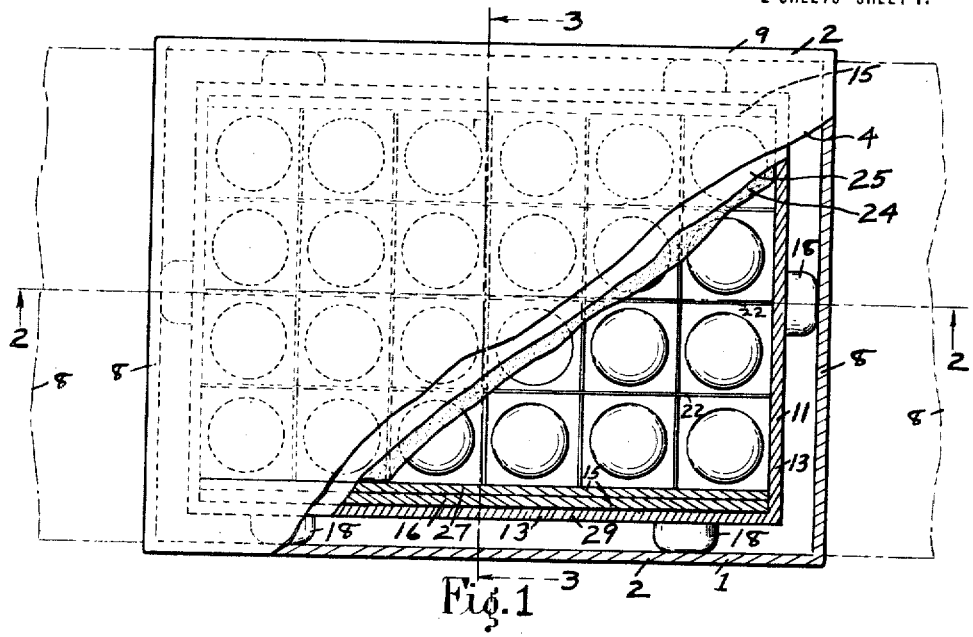
Fig. 1
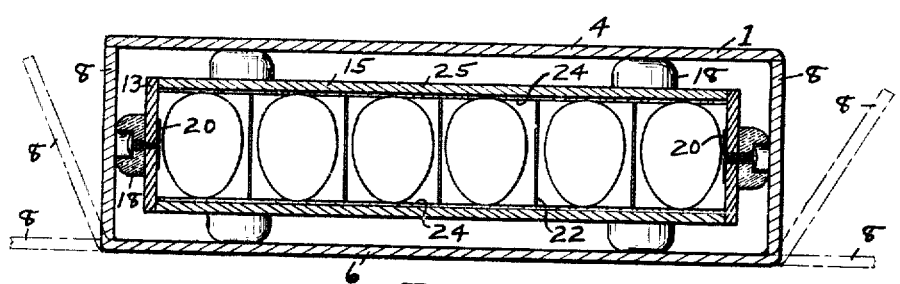
Fig. 2
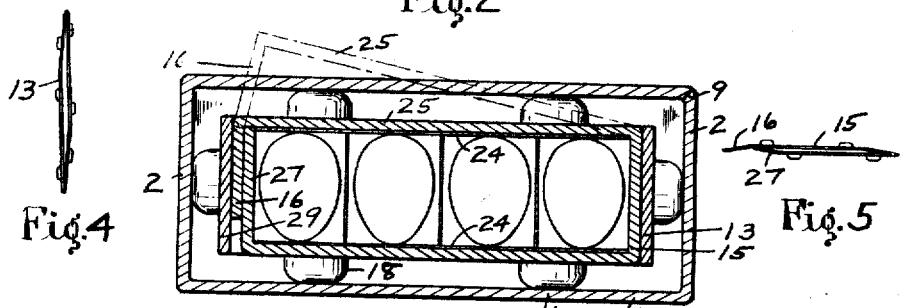
Fig. 4
Fig. 3
Fig. 5
Fig. 6
WITNESSES:
INVENTOR
Orin W. Ward,
BY
Delos G. Haynes,
ATTORNEY

UNITED STATES PATENT OFFICE.

ORIN W. WARD, OF NEW YORK, N. Y.

CONTAINER.

1,290,689.

Specification of Letters Patent.

Patented Jan. 7, 1919.

Application filed July 7, 1916. Serial No. 107,955.

*To all whom it may concern:*

Be it known that I, ORIN W. WARD, a citizen of the United States, and residing in the city of New York, in the county and State of New York, have invented a new and Improved Container, of which the following specification is a full disclosure.

This invention relates to containers, and with regard to certain more specific features, to a device for shipping eggs, and is an improvement upon the structure shown in my prior Patent 1,149,877, dated August 10, 1915.

Among the objects of the present invention may be noted the provision of a simple and inexpensive container for shipping fragile articles, such as eggs; the provision of a container that is light in weight and yet sufficiently strong and durable to withstand the rigors of transportation by parcel post, express, or other means; the provision of a device of the above character which may be cheaply constructed of few parts easily filled and emptied, and readily available for inspection at any time; and the provision of a compact container usable repeatedly, and so constructed as to protect its contents from shocks as well as to take care of any moisture within caused by breaking of contents, and collapsible for purposes of shipment or storage when empty. Other objects will be in part obvious and in part pointed out hereinafter.

The invention accordingly comprises the features of construction, combinations of elements and arrangements of parts which are to be exemplified in the structure hereinafter described, and the scope of the application of which will be indicated in the following claim.

In the accompanying drawings, in which are shown two of various possible embodiments of this invention, Figure 1 is a plan, partly in section, of a preferred form of container, made in accordance with the present invention;

Fig. 2 is a longitudinal sectional elevation on the line 2—2, Fig. 1;

Fig. 3 is a transverse sectional elevation on the line 3—3, Fig. 1;

Figure 7:
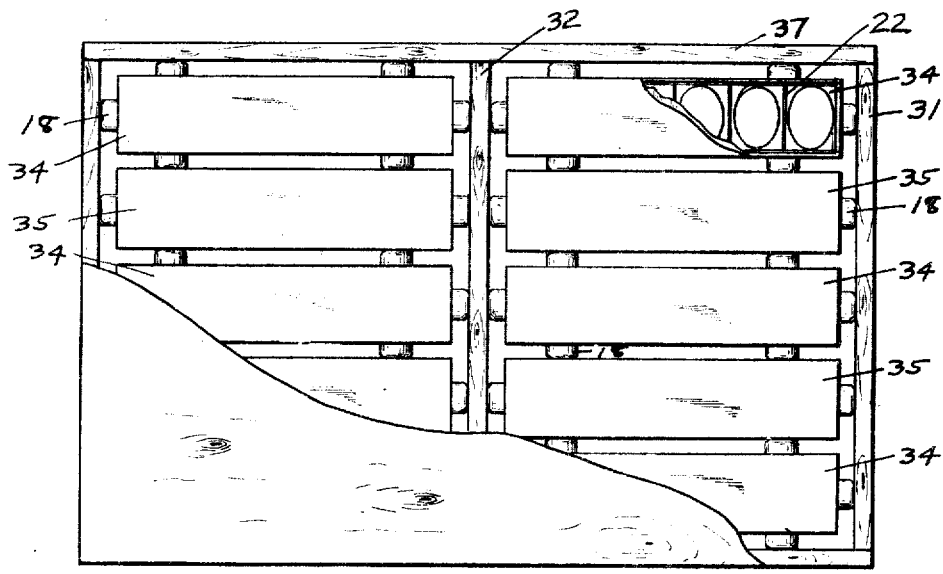
Figure 8:
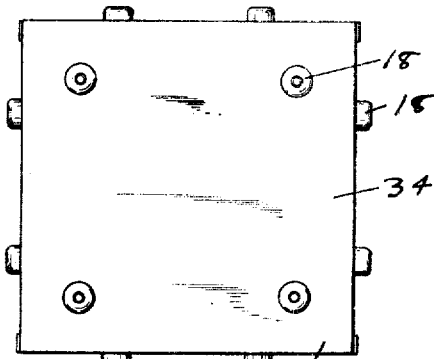
Figure 9:
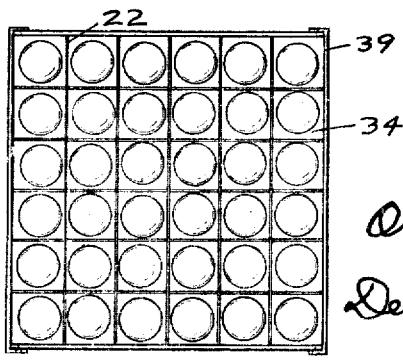

Figs. 4, 5, and 6 are reduced diagrammatic illustrations of certain portions when collapsed for shipment empty;

Fig. 7 is a front elevation of a modification, with parts broken away to show the construction more clearly;

Fig. 8 is a plan of one of the boxes or containers within the outer container illustrated in Fig. 7; and Fig. 9 is a plan of the box shown in Fig. 8, with the cover removed.

Similar reference characters indicate similar parts throughout the several views of the drawings.

In considering the relation of this invention to the prior art, it may be noted that for many years there has been a demand for containers designed to protect fragile articles in transit; that such demand has been particularly insistent for containers for shipping eggs, of which there are doubtless many millions broken in handling every year, with a corresponding economic loss, much of which would be avoided by the use of adequate containers. The container should preferably be collapsible, for economy of space in storage and in shipment when empty. Furthermore, the factor of expense makes it advisable to have the container inexpensive to construct, easy to fill and empty, and usable repeatedly, instead of having to be partly or wholly destroyed after each shipment. Furthermore, the weight of the container, which is one criterion of its usefulness, must be kept to a fairly low value in order to minimize the transportation charges both when the container is full and when it is empty. And the shock-absorbing quality of the container is, of course, an important, if not a prime requisite to its availability for efficient service. In the present invention, these requirements and desiderata are adequately met, and as the description thereof progresses, it will be apparent that the demands for low cost, light weight and protection of contents, in containers of this type, are fully realized in the structures of the present invention.

Referring now more particularly to Figs. 1 to 6 of the accompanying drawings, there is shown at 1 an outer rectangular box comprising the sides 2, top 4, bottom 6 and hinged ends 8, shown in partly open and fully open position by means of dotted lines in Fig. 2. This outer box 1 is preferably constructed of corrugated paper, and it will be noted that the ends of the paper need to be secured together at only one edge, which may be the edge 9, Figs. 1 and 3.

Within this outer box 1 is removably secured an inner box 11, likewise made preferably of corrugated paper. This inner box 11 is made in two parts, first, an outer rectangular casing 13, open at top and bottom, and, second, an inner rectangular casing open at its ends and provided with a flap 16 to afford a double thickness at one side. When the inner casing 15 is fitted into the outer casing 13, the parts are then in the position illustrated in Figs. 2 and 3, from which it will be seen that a single thickness of material, such as corrugated paper, is provided at the top and bottom and ends of this inner box 11, while at one of the sides there is a double thickness and at the other side a triple thickness. The outer casing may be made of corrugated paper whose ends need to be secured together at only one edge, such as the edge 17; this outer casing is shown collapsed in Fig. 4. The ends of the inner casing 15 need not be secured at all. This inner casing is shown collapsed in Fig. 5. Within the inner casing there is preferably provided a set of collapsible cardboard spacing strips 22 to separate the eggs or other units of material. And a suitable absorbent, such as cotton batting 24, may be provided if the regulations of the Post Office or other carrier require that such precaution be taken.

The outer box 1 and the inner box 11 are spaced apart by suitable shock-absorbing devices, such as the rubber cushions or bumpers 18, which in the present instance are secured as by the ordinary brass paper-fasteners 20, Fig. 2, to the inner box 11. If desired, the cushions 18 may be glued to the inner box 11; but glue is liable to soften in service, or the outer covering of the corrugated paper, to which the glue adheres, is liable to be torn off from the rest of the paper, and thus the cushion becomes separated from the corrugated paper even though the glue continues to hold the cushion to the covering material. Rubber cushions of the general type illustrated herein are inexpensive, are readily affixed to the several portions of the casings, and are effective as shock-absorbers to protect the contents of the container from abnormally severe use as well as from the shocks and jars encountered in the ordinary handling of such containers.

A preferred method of using the above-described container is as follows: Assume that the parts are collapsed as shown in Figs. 4, 5 and 6. The outer and inner casings 13, 15, are first opened, and the latter inserted in the former, with the top 25 and flap 16 open: the top and flap are shown partly open by means of dotted lines in Fig. 3. A layer of cotton batting or other absorbent is then placed in the bottom of the inner casing 15, after which the spacing strips 22 are placed in position. The eggs or other units of material, numbering in this instance, twenty-four, are then put in place. The next step is to place a layer of cotton batting over the tops of the eggs, after which the top 25 and flap 16 are lowered to their closed position illustrated in solid lines in Fig. 3, with the flap between the side 27 of the inner casing and the side 29 of the outer casing 13. The inner box 11 is then complete, and when the outer box 1 has been opened from its collapsed position illustrated in Fig. 6 to the position illustrated in dotted lines in Fig. 2, with one or both of its ends 8 open, the inner box 11 may be pushed into the outer box 1. The ends 8 of the outer box are then brought to their solid-line position shown in Fig. 2, in which position they may be secured by gummed paper, or by other devices such as cord if the regulations of the transporting agency require that the contents of the container be readily available for inspection en route.

In view of the above, it is believed that the structure and method of use of the container illustrated in Figs. 1 to 6 will be clear without further elaboration.

In the modification shown in Figs. 7, 8 and 9, there is illustrated at 31 a comparatively strong receptacle or container, such as a wooden box, divided into two equal parts by the vertical wooden partition 32. Into each of these two equal halves thus formed, there may be placed several, for example five, boxes or containers 34, 35, each adapted to contain a number of eggs or other units of material, as indicated in Fig. 9. These several boxes are spaced apart by shock-absorbing devices such as rubber cushions 18 similar to those illustrated in Figs. 1 to 6; and the cushions may be applied to the respective containers by fastening devices similar to those shown at 20 in Fig. 2. A wooden top 37 holds the boxes 34, 35, in place, and completes the structure.

A preferred arrangement for the boxes 34, 35, comprises alternate boxes 34, with cushions on the four sides and top and bottom, and intermediate boxes 35, with cushions on the sides only. One of the boxes 34 is shown in Figs. 8 and 9; the boxes 35 are similar to these, except that in the latter there are no cushions 18 at either top or bottom. The boxes 34, as indicated in Figs. 8 and 9, each comprise a cover 38, to which are affixed the cushions for the top and the four sides, and a second member 39 upon which the top or cover 38 fits. Both the cover 38 and the member 39 may be made of corrugated paper; and both may be collapsible, if desired, but inasmuch as the non-collapsing wooden box is ordinarily returned empty with the boxes 34, 35 in it, there is usually little to be gained by providing collapsible boxes 34, 35. Within the member 39 of each box 34, 35, there are provided cardboard spacing strips 22, and if desired an absorbent material, such as cotton batting of the type shown at 24 in Figs. 2 and 3. As in the embodiment of the invention illustrated in Figs. 1 to 6, the size of the cushions 18 should be proportionate to the stresses they will have to bear; it has been found that excellent results may be obtained by having the ratio of cushion size to size of container about as indicated in the drawings herein.

From the above, it will be seen that the several objects of the invention are achieved, and other advantageous results attained.

As various changes might be made in the above construction, and as the above invention might be embodied in different forms, it is intended that all matters set forth in the above description and in the accompanying drawings, shall be interpreted as illustrative and not in a limiting sense.

Having thus revealed my invention, I desire to claim as new and secure by Letters Patent of the United States:

A container combining an outer box; an inner box; and cushions secured by fastening devices to the inner box and serving to space the boxes resiliently, said cushions each comprising a resilient member.provided with a central countersunk aperture through which a headed fastener may be passed to secure the cushion to the box, said fastener being bent over at its opposite end to hold the parts in assembled relation.

In witness whereof, I hereunto subscribe my name, as attested by the two subscribing witnesses.

ORIN W. WARD.

Witnesses:
FREDERIC A. LOASE,
AGNES SCHULL-GRAMM.

Copies of this patent may be obtained for five cents each, by addressing the "Commissioner of Patents, Washington, D. C."